United States Patent [19]

Bienville

[11] 4,315,163
[45] Feb. 9, 1982

[54] MULTIPOWER ELECTRICAL SYSTEM FOR SUPPLYING ELECTRICAL ENERGY TO A HOUSE OR THE LIKE

[76] Inventor: Frank Bienville, 6140 Rio Linda Blvd., Rio Linda, Calif. 95673

[21] Appl. No.: 187,810

[22] Filed: Sep. 16, 1980

[51] Int. Cl.³ .............................................. H02J 9/04
[52] U.S. Cl. .................................................... 307/66
[58] Field of Search ...................... 307/46, 47, 48, 66, 307/67

[56] References Cited

U.S. PATENT DOCUMENTS

| | | | |
|---|---|---|---|
| 3,594,586 | 7/1971 | Toesca | 307/66 |
| 3,991,319 | 11/1976 | Servos et al. | 307/64 |
| 4,255,697 | 3/1981 | Buhler | 307/66 X |

Primary Examiner—Michael L. Gellner
Attorney, Agent, or Firm—Mark C. Jacobs

[57] ABSTRACT

A multipower electrical system is disclosed for supplying electrical energy to a house. In one embodiment of the invention utility company power is connected through a switch system to a 100 AMP main connected to the home and also to a timer. The timer controls an AC generator which is used to charge a battery system. The battery system in turn drives a 100 AMP dynamotor which supplies power to the 100 AMP main through the switch system. The battery driven dynamotor is employed as the primary source of power. In another embodiment of the invention a 100 AMP generator with a D.C. to A.C. converter supplies electrical energy to the 100 AMP main of the house through a switch system. The 100 AMP generator is driven with energy from either a battery system, a four cylinder engine, a solar system or a wind system powered turbine. The solar system, wind system and four cylinder engine are also used to charge the battery system. Energy is also supplied to the 100 AMP main and the battery system from utility company power, when needed.

11 Claims, 2 Drawing Figures

MULTIPOWER ELECTRICAL SYSTEM FOR SUPPLYING ELECTRICAL ENERGY TO A HOUSE OR THE LIKE

BACKGROUND OF THE INVENTION

The present invention relates to a multipower electrical system and more particularly to a multipower electrical system for supplying electrical energy to a house or the like.

DESCRIPTION OF KNOWN PRIOR ART

In U.S. Pat. No. 4,080,221 to Manelas there is disclosed a multipowered electrical system for a building structure in which a solar conversion system is operatively associated with an electric storage battery and a conventional utility source.

In U.S. Pat. No. 4,099,381 to Rappoport there is disclosed a geothermal and solar integrated energy conversion system.

In U.S. Pat. No. 3,489,915 to Engelhardt there is disclosed a combined solar array and battery charges system.

In U.S. Pat. No. 3,339,082 to Rhyne there is disclosed an AC power system having alternative sources of supply, including an oscillator, a phase shifting network and an associated solid state network. The system is capable of being synchronized with a conventional power source to the load whenever the main supply is loaded down or otherwise ineffective for satisfying consumer needs.

Other U.S. patents of interest are U.S. Pat. No. 3,991,319 to Serros, U.S. Pat. No. 3,778,634 to Hanrihan, U.S. Pat. No. 3,816,304 to Cardwell and U.S. Pat. No. 3,614,535 to Apel.

SUMMARY OF THE INVENTION

It is an object of this invention to provide a new and improved multipower electrical system for supplying electrical energy to a house of the like.

It is another object of this invention to provide a multipower electrical system for supplying electrical energy to a house or the like which does not rely primarily on utility company power.

It is still another object of this invention to provide a multipower electrical system for supplying electrical energy to a house or the like which utilizes solar energy, wind energy, a combustion engine and utility company power.

In a multipower electrical system constructed according to one embodiment of this invention utility company power is connected through a switch system to a 100 AMP main connected to the home and also to a timer. The timer controls an AC generator which is used to charge a battery system. The battery system in turn drives a 100 AMP dynamotor which supplies power to the 100 AMP main through the switch system. The battery driven dynamotor is employed as the primary source of power. In another embodiment of the invention a 100 AMP generator with a D.C. to A.C. converter supplies electrical energy to the 100 AMP main of the house through a switch system. The 100 AMP generator is driven with energy from either a battery system, a four cylinder engine, a solar system or a wind system powered turbine. The engine is powered by gasoline or alcohol. The solar system, wind system and four cylinder engine are also used to charge the battery system. Energy is also supplied to the 100 AMP main and the battery system from utility company power, when needed.

BRIEF DESCRIPTION OF THE DRAWINGS

In the drawings where like reference numerals represent like parts.

DESCRIPTION OF PREFERRED EMBODIMENTS

Figure 1:
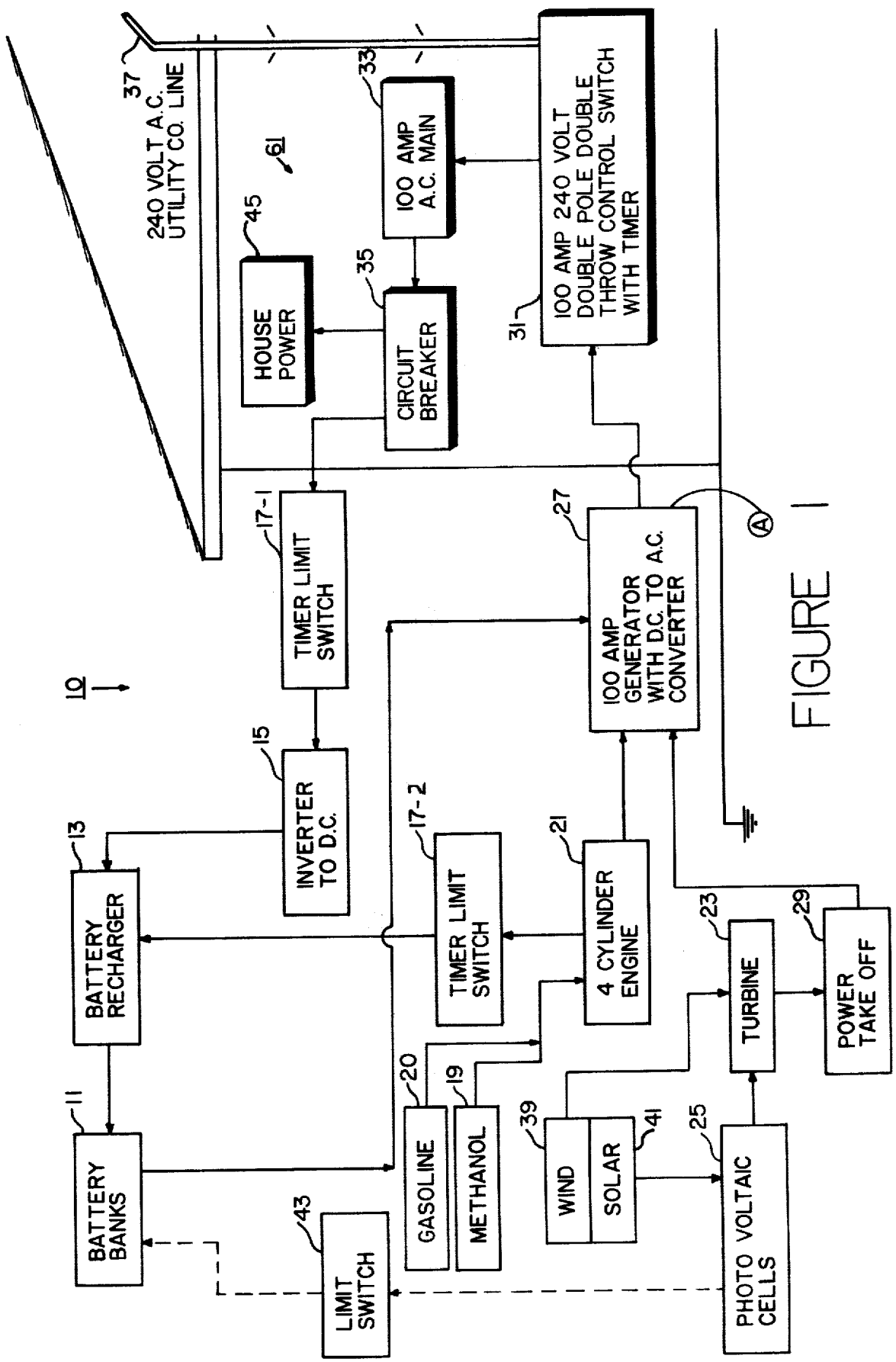
FIG. 1 is a block diagram of a multipower electrical system constructed according to one embodiment of the invention.

Referring now to the drawings, there is shown in FIG. 1 an embodiment of a multipower electrical system constructed according to the teachings of this invention and identified by reference numeral 10.

The system includes a battery bank 11 for storing electrical energy. Battery bank 11 receives electrical current from a battery recharger 13 which receives direct current from an AC to DC inverter 15. AC to DC inverter 15 receives AC current through a timer limit switch 17-1. Battery recharger 13 also receives direct current through a timer limit switch 17-2.

A supply of methanol 19 and/or a supply of gasoline 20 provide fuel to drive a 4 cylinder engine 21 whose electrical current output is coupled to timer limit switch 17-2.

A turbine 23 is driven with electrical energy derived from a bank of photovoltaic cells 25 and supplies DC current to a 100 AMP generator with a DC to AC converter 27 through a power take off device 29. DC current is also supplied to the 100 AMP generator with a DC to AC converter from the four cylinder engine 29 and from the battery bank 11. The output of the 100 AMP generator with the DC to AC converter is fed into a 100 AMP 240 volt double throw double pole control switch with a timer 31 whose output, in turn, is fed into the 100 AMP AC main 33. The output of the 100 AMP AC main is fed into a circuit breaker 35. Electrical energy is also fed into the 100 AMP 240 volt double pole double throw control switch with times 31 from a 240 volt AC utility company line 37.

Circuit breaker 35 outputs to the timer limit switch 17-1.

A wind system 39 such as a windmill supplies wind energy to turbine 23. A solar system 41, such as an arrangement of reflectors and lenses directs solar energy to the array of photo-voltaic cells 25 which converts the solar energy to electrical energy and then either conducts the electrical energy to the battery bank 11 through a limit switch 43 or uses the electrical energy to drive the turbine 23.

Finally, the output from circuit breaker 45 is fed also into the house power 45.

The timers 17-1, 17-2 and 31 are arranged to maximize the use of solar and wind energy, with the four cylinder engine serving as a backup for the solar energy and wind energy and the 240 volt AC utility company line serving as a backup for the four cylinder engine.

In the operation of the system, solar and wind energy are used to supply electrical current to the battery bank 11 and to drive turbine 23 which drives the 100 AMP generator 27. The output of 100 AMP generator 27 is fed into the 100 AMP AC main which supplies current to the house power 45 and current to the battery charger 13 which charges the battery bank 11 and current from the 240 volt AC utility company line is also fed into the 100 AMP AC main, when needed. The output of the 100 AMP generator 27 is monitored with an ammeter A.

Figure 2:
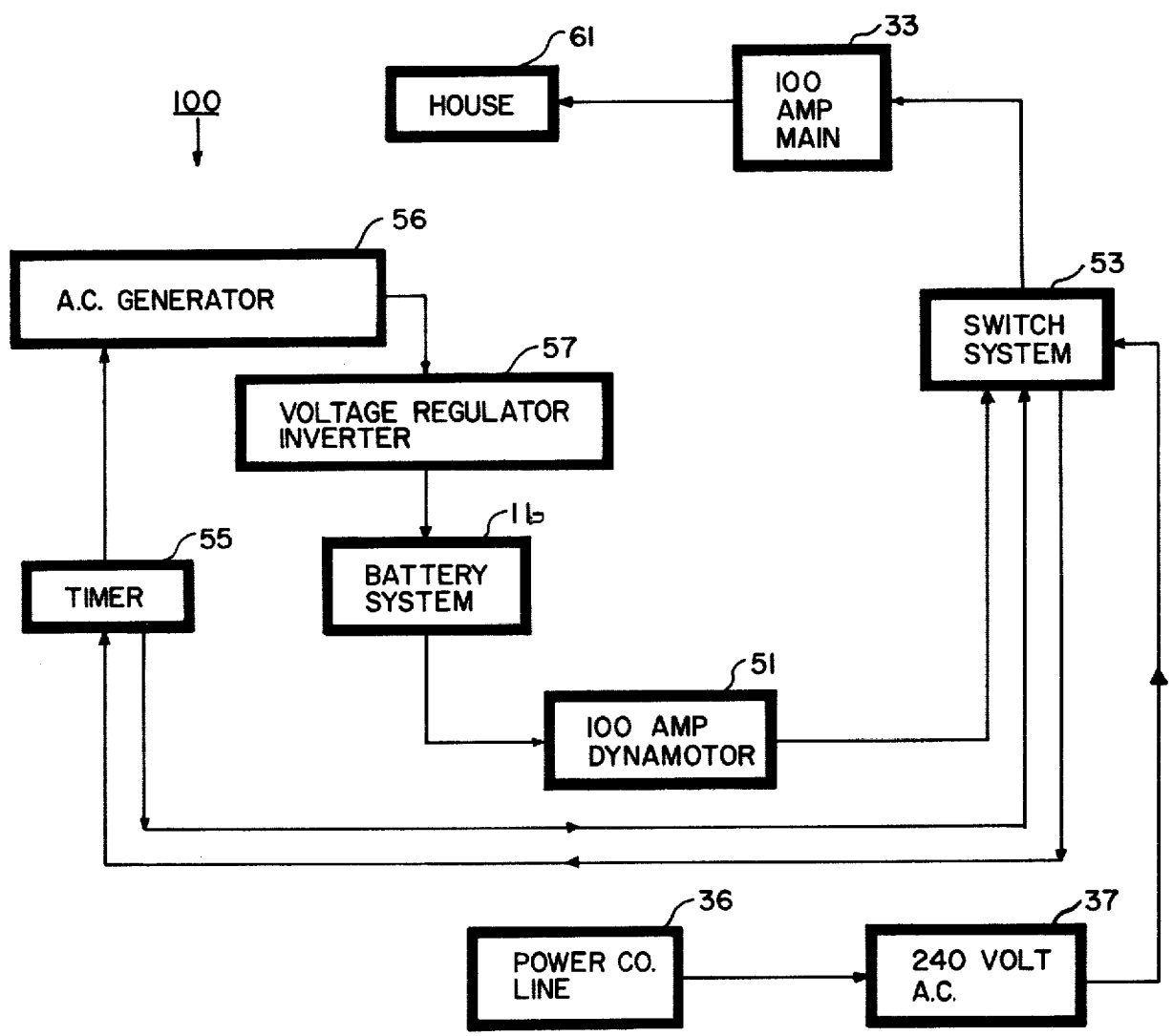
FIG. 2 is a block diagram of a multipower electrical system constructed according to another embodiment of the invention.

Referring now to FIG. 2, there is shown a second embodiment of a multipower electrical system constructed according to the teachings of this invention and identified generally by reference numeral 100.

The system 100 includes a battery system 16, a 100 AMP main 33, a power company line 36 and a 240 volt AC utility company line 37. The system 100 further includes a 100 AMP dynamotor, a switch system 53, a timer 55, an AC generator 56 and a voltage regulator inverter 57. The electrical energy produced by system 100 is supplied to a house 61.

The power from power company line 36 is coupled to switch system 53 through 240 volt AC utility company line 37. Switch system 53 is coupled to house 61 through 100 AMP main 33. Switch system 53 is also connected to timer 55 which is connected to AC generator 55. AC generator 56. AC generator 56 is connected to battery system 16 through voltage regulator inverter 57 and the battery system 16 is connected to 100 AMP dynamotor which is also connected to switch system 53.

In the operation of system 100, electrical energy from power company line 36 is fed into switch system 53 where it is used to supply energy to house 61 through the 100 AMP main and to supply energy to drive AC generator 56. The output of AC generator 56 is converted to a DC current through the voltage regulator converter 57 and used to charge up battery system 16. Battery system 16 is used to drive the 100 AMP dynamotor 51 which also supplies AC energy to the 100 AMP main 33 through switch system 53. In the operation of the system 100, the battery operated dynamotor 51 is the primary source of power and the energy derived from power company line 36 is used as the secondary source of power. Thus, timer 55 and switch system 53 are arranged so that during "off-peak" hours energy from power company line 36 supplies energy to house 61 and to AC generator 56 for charging battery system 16 and that during the other hours, the 100 AMP dynamotor 51 is the primary source of power to house 61.

Although this invention has been described with reference to particular embodiments, it will be understood to those skilled in the art that this invention is also capable of further and other embodiments within the spirit and scope of the appended claims.

What is claimed is:

1. A system for supplying electrical energy to a 100 AMP main connected to a house comprising:
   (a) a utility company power line
   (b) a 100 AMP dynamotor
   (c) a battery system for supplying energy to the 100 AMP dynamotor
   (d) an AC generator for generating energy for charging the battery system, and
   (e) a switch system coupled to said 100 AMP main, said utility company power line and said 100 AMP dynamotor.

2. The system of claim 1 and wherein said switch system is coupled to said AC generator through a timer.

3. The system of claim 2 and wherein said AC generator is coupled to said battery system through a voltage regulator inverter.

4. The system of claim 3 and wherein said battery system and dynamotor are employed as the primary source of power for the house.

5. A multipower electrical system for supplying electrical energy to a 100 AMP AC main connected to a house comprising:
   (a) a 100 AMP generator with a DC to AC converter,
   (b) means for supplying electrical energy to drive said 100 AMP generator,
   (c) a utility company power line, and
   (d) switch means with a timer for coupling said 100 AMP generator and said utility company power line to said 100 AMP AC main.

6. The system of claim 5 and wherein said means for supplying electrical energy to drive said 100 AMP generator comprises a battery bank.

7. The system of claim 6 and further including:
   (a) a battery recharger for recharging said battery bank,
   (b) an AC to DC inverter coupled to said battery recharger, and
   (c) a switch coupled between said AC to DC inverter and said 100 AMP AC main.

8. The system of claim 7 and wherein said means for supplying electrical energy to drive said 100 AMP generator further includes a four cylinder engine, powered by a member selected from the group consisting of alcohol, gasoline and mixtures thereof.

9. The system of claim 7 and wherein said means for supplying electrical energy to drive said 100 AMP generator further includes a solar system.

10. The system of claim 7 and wherein said means for supplying electrical to said 100 AMP generator further includes a wind system.

11. The system of claim 8 and wherein said gas engine is also coupled to said battery recharger.

* * * * *